(12) United States Patent
Patel et al.

(10) Patent No.: US 9,462,670 B2
(45) Date of Patent: Oct. 4, 2016

(54) DIFFUSER SHAPE VENT SLOTS IN A HAND TORCH SHIELD CASTELLATION

(71) Applicant: Hypertherm, Inc., Hanover, NH (US)

(72) Inventors: Shreyansh Patel, Lebanon, NH (US);
Zheng Duan, Hanover, NH (US);
Steven Moody, Charlestown, NH (US);
Nicholas Pecor, Northfield, VT (US)

(73) Assignee: Hypertherm, Inc., Hanover, NH (US)

( * ) Notice: Subject to any disclaimer, the term of this patent is extended or adjusted under 35 U.S.C. 154(b) by 56 days.

(21) Appl. No.: 14/468,258

(22) Filed: Aug. 25, 2014

(65) Prior Publication Data
US 2015/0014285 A1    Jan. 15, 2015

Related U.S. Application Data

(63) Continuation-in-part of application No. 12/967,407, filed on Dec. 14, 2010, now Pat. No. 8,835,796.

(60) Provisional application No. 61/905,026, filed on Nov. 15, 2013, provisional application No. 61/365,247, filed on Jul. 16, 2010.

(51) Int. Cl.
| | |
|---|---|
| *B23K 10/00* | (2006.01) |
| *H05H 1/34* | (2006.01) |
| *B23K 9/013* | (2006.01) |
| *B23K 10/02* | (2006.01) |

(52) U.S. Cl.
CPC ............ *H05H 1/34* (2013.01); *B23K 9/013* (2013.01); *B23K 10/00* (2013.01); *B23K 10/02* (2013.01); *H05H 2001/3457* (2013.01); *H05H 2001/3478* (2013.01)

(58) Field of Classification Search
CPC .......... H05H 1/34; H05H 2001/3457; H05H 2001/3478; B23K 10/00; B23K 9/013; B23K 10/02

USPC ............ 219/121.39, 121.48, 74, 75, 121.51, 219/121.52, 121.59, 121.45; 313/231.41; 315/111.21

See application file for complete search history.

(56) References Cited

U.S. PATENT DOCUMENTS

| | | | |
|---|---|---|---|
| 4,861,962 A | 8/1989 | Sanders et al. | |
| 5,409,164 A * | 4/1995 | Delzenne | H05H 1/34 239/132.3 |
| 5,763,851 A * | 6/1998 | Forster | H01J 37/32477 156/345.48 |
| 6,163,008 A * | 12/2000 | Roberts | H05H 1/34 219/121.48 |
| 6,914,211 B2 | 7/2005 | Brasseur et al. | |
| 2004/0169018 A1 | 9/2004 | Brasseur et al. | |
| 2007/0175871 A1* | 8/2007 | Brezni | H05H 1/30 219/121.52 |
| 2007/0210035 A1 | 9/2007 | Twarog et al. | |

* cited by examiner

*Primary Examiner* — Mark Paschall
(74) *Attorney, Agent, or Firm* — Proskauer Rose LLP

(57) ABSTRACT

A torch tip for a plasma arc torch includes a body having a first end, configured to attach to the torch, and a second end, where an end wall is disposed. A plasma exit orifice is formed in the end wall. At least two castellations are formed in the end wall. Each castellation has a castellation width defined by the distance between the sidewalls of that castellation. At least one slot is disposed between two castellations. Each slot has a slot width defined by a distance between the sidewalls of its adjacent castellations. The slot width can be at least twice the castellation width. Each slot also has a slot floor and an exterior shape. The slot floor can have slope that tapers toward the first end of the body in an outward radial direction and the exterior shape of the slot can have a generally V-shaped or U-shaped contour.

20 Claims, 16 Drawing Sheets

| | EXAMPLE 1 | | | EXAMPLE 2 | | | EXAMPLE 3 | | |
|---|---|---|---|---|---|---|---|---|---|
| | SLOT WIDTH | CASTELLATION WIDTH | RATIO | SLOT WIDTH | CASTELLATION WIDTH | RATIO | SLOT WIDTH | CASTELLATION WIDTH | RATIO |
| INNER | RS$_I$ = 0.222 | RC$_I$ = 0.042 | 5.286 | RS$_I$ = 0.207 | RC$_I$ = 0.065 | 3.185 | RS$_I$ = 0.221 | RC$_I$ = 0.044 | 5.023 |
| ALONG | RS$_A$ = 0.233 | RC$_A$ = 0.073 | 3.192 | RS$_A$ = 0.218 | RC$_A$ = 0.094 | 2.319 | RS$_A$ = 0.239 | RC$_A$ = 0.064 | 3.734 |
| OUTER | RS$_O$ = 0.251 | RC$_O$ = 0.121 | 2.074 | RS$_O$ = 0.235 | RC$_O$ = 0.141 | 1.667 | RS$_O$ = 0.269 | RC$_O$ = 0.098 | 2.745 |
| CONTOUR ANGLE | 124 | | | 122 | | | 119 | | |
| STRIP LIFE (ARC HOURS) | ........ | | | 2.2 | | | 8.06 | | |
| DROP CUT (20 STRIPS @ 20 ipm 3/8" MS) | 00% | | | 80% | | | 100% | | |
| MAX. CUT SPEED (3/8" MS) | 21 ipm | | | 21 ipm | | | 21 ipm | | |

FIG. 12B

DIFFUSER SHAPE VENT SLOTS IN A HAND TORCH SHIELD CASTELLATION

RELATED APPLICATIONS

This application claims the benefit of and priority to U.S. Provisional Application No. 61/905,026, filed Nov. 15, 2013, the entire teachings of which are incorporated by reference herein. This application is a Continuation-in-Part of U.S. patent application Ser. No. 12/967,407, filed on Dec. 14, 2010, which claims the benefit of and priority to U.S. Provisional Application No. 61/365,247, filed Jul. 16, 2010, the entire teachings of which are incorporated by reference herein.

TECHNICAL FIELD

The present invention relates generally to plasma arc cutting torches, and more particularly, to diffuser shape vent slots in a hand torch shield consumable.

BACKGROUND

Welding and plasma arc torches are widely used in the welding, cutting, and marking of materials. A plasma torch generally includes an electrode and a nozzle having a central exit orifice mounted within a torch body, electrical connections, passages for cooling, passages for arc control fluids (e.g., plasma gas), and a power supply. Optionally, a swirl ring is employed to control fluid flow patterns in the plasma chamber formed between the electrode and nozzle. The torch produces a plasma arc, a constricted ionized jet of a gas with high temperature and high momentum. Gases used in the torch can be non-reactive (e.g., argon or nitrogen) or reactive (e.g., oxygen or air). In operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

In some torches, a shield is used to prevent molten spatter from damaging the other components of the torch, for example, the electrode, nozzle, or swirl ring. Often, the molten spatter builds up on the shield causing double arcing or melting of the shield. The build-up typically increases as the cutting time increases.

To decrease the amount of molten spatter that builds up on the shield, prior torches have used shields with vent slots added to the end face of the shield. The vent slots act as channels for melted metal, for example, slag, to leave the end face of the shield. These shields employ four slots that are arranged in a symmetrical pattern about the end face surrounding a plasma exit orifice. The slots retain the same dimensions as a function of distance from the plasma exit orifice.

Prior art shields with vent slots do not adequately remove slag for certain applications. Instead, the slag builds up on the shield and within the vent slots. The slag can block all or a portion of the vent slots resulting in a double arc or melting of the shield. Cleaning slag build-up is difficult. Operators often replace the shield once build-up has occurred instead of performing the time-consuming task of cleaning the shield. The slag build-up can also lead to premature failure of the shield and, sometimes, the premature failure of other consumables. In addition, slag build-up can increase the down time of the torch because the operator is required to stop the system to either clean or replace the shield when too much build-up occurs. Increased down time and premature consumable failure result in increased operating costs.

SUMMARY OF THE INVENTION

What is needed is a shield that reduces the molten spatter buildup during operation of the torch. Several variables can be altered to address the problem, for example, shield slot size and shape and shield castellation mass and shape. Altering the shield slot size and shape affects the molten spatter buildup. For example, increasing the size of the shield slot increases the amount of molten spatter that can be removed from the shield. Altering the shield castellation mass and shape affects the heat transfer properties of the shield (e.g., how quickly the shield melts). For example, increasing the castellation mass increases the amount of heat the shield can absorb.

However, simply reducing the number and/or size of the shield slots to increase the number and/or size of the castellations or vice-versa is insufficient. First, altering the properties of the vent slots to maximize molten spatter removal adversely affects the castellation mass and heat transfer properties of the shield. Second, altering the properties of the castellation mass to increase the heat transfer properties of the shield adversely affects the vent slot openings and shape resulting in molten spatter buildup. Therefore, the number, size, and shape (or geometry) of both the shield slots and castellations should be balanced or optimized to avoid slag build-up and premature melting, respectively. The appropriate balance of these factors can increase the performance and life of the shield.

The shield castellations and vent slots can be configured such that each shield slot has a width that is approximately equal to the width of its adjacent castellations. However, such shield configurations (e.g., configurations in which the castellation width and the slot width have a 1:1 ratio) can lead to shortened shield and/or nozzle life and may make the plasma arc less stable with unstable plasma gas and shield gas flow. This instability can lead to degraded workpiece processing and reduce the life expectancy of the nozzle to less than 1 arc hours.

In one aspect, the invention features a torch tip for a plasma arc torch for reducing molten spatter buildup during operation of the plasma arc torch. The torch tip includes a body having a first end and a second end. The first end of the body is configured to attach to the plasma arc torch. The torch tip also includes an end wall disposed at the second end of the body. A plasma exit orifice is formed in the end wall at the second end of the body. At least two castellations are formed in the end wall. At least one slot is disposed between two castellations. The at least one slot is defined by a first castellation wall, a second castellation wall, and a slot floor. The first castellation wall is opposite the second castellation wall. The torch tip having at least one of the following characteristics: (a) a slope of the slot floor within the at least one slot tapers in an outward radial direction relative to the plasma exit orifice toward the first end of the body, or (b) a distance between the first and second castellation walls along the slot floor increases with distance away from the plasma exit orifice.

In another aspect, the invention features a shield for a plasma arc torch. The shield includes a body having a first end and a second end. The first end of the body is configured to attach to the plasma arc torch. The shield also includes an end wall disposed at the second end of the body. A plasma exit orifice is formed in the end wall at the second end of the body. The shield also includes no more than three slots disposed between the at least two castellations. Each slot has a generally semi-frustoconical geometry. Each slot is defined by a first castellation wall, a second castellation wall, and a slot floor. The first castellation wall is opposite the second castellation wall.

In yet another aspect, the invention features a torch tip for a plasma arc torch for reducing molten spatter buildup during operation of the plasma arc torch. The torch tip includes a body having a first end and a second end. The first end of the body configured to attach to the plasma arc torch. An end wall is disposed at the second end of the body. A plasma exit orifice is formed in the end wall at the second end of the body. Three castellations are formed in the end wall. The torch tip includes three slots disposed between the castellations. Each slot is defined by a first castellation wall, a second castellation wall, and a slot floor. The first castellation wall is opposite the second castellation wall.

In another aspect the invention features a plasma arc torch system. The system includes a torch body defining a plasma gas flow path for directing a plasma gas to a plasma chamber in which a plasma arc is formed. The system also includes an electrode disposed within the torch body. The system further includes a nozzle disposed relative to the electrode at a distal end of the torch body to define the plasma chamber. A shield is disposed relative to an exterior surface of the nozzle at the distal end of the torch body. The shield includes a shield body having a first end configured to attach to the torch body and a second end. An end wall is disposed at the second end of the body. The shield also includes a plasma exit orifice formed in the end wall at the second end of the shield body. At least two castellations are formed in the end wall. The shield also includes at least one slot disposed between two castellations. The at least one slot is defined by a first castellation wall, a second castellation wall, and a slot floor. The first castellation wall is opposite the second castellation wall. The shield has at least one of the following characteristics: (a) a slope of the slot floor within the at least one slot tapers in an outward radial direction relative to the plasma exit orifice toward the first end of the body, or (b) a distance between the first and second castellation walls along the slot floor increases with distance away from the plasma exit orifice.

In some embodiments, the torch tip or shield includes three slots. The torch tip or shield can include three slots and three castellations separating each of the slots. In some embodiments, each castellation has a substantially planar top surface.

The at least one slot can have a rounded, generally semi-cylindrical, or generally semi-frustoconical geometry.

The torch tip can be a shield. In some embodiments, the torch tip or shield is made from a material having a high thermal conductivity. The torch tip or shield can be formed of copper.

In some embodiments, the first castellation wall and the second castellation wall are angled from about 45 arc degrees to about 75 arc degrees about the end wall. In some embodiments, the first castellation wall and the second castellation wall are angled from about 100 arc degrees to about 125 arc degrees about the end wall.

In some embodiments, the height of the first and second castellation walls increases with distance from the exit orifice.

The torch tip or shield can have at least one of the following characteristics: (a) a slope of the slot floor within the at least one slot tapers in an outward radial direction relative to the plasma exit orifice toward the first end of the body, or (b) a distance between the first and second castellation walls along the slot floor increases with distance away from the plasma exit orifice. In some embodiments, the slots can extend radially from the plasma exit orifice.

In one aspect, a torch tip for a plasma arc torch is featured. The plasma torch tip can reduce molten spatter buildup during operation of the plasma arc torch, lengthen nozzle life, and increase plasma arc stability. The torch tip comprises a body that includes a first end and a second end. The first end of the body attaches to the plasma arc torch. An end wall is disposed at the second end of the body and a plasma exit orifice is formed in the end wall at the second end of the body. At least two castellations are formed in an exterior surface of the end wall. Each castellation includes a castellation width that is defined by a distance between a first sidewall of each castellation and a second sidewall of each castellation at the second end of the body. The torch tip also comprises at least one slot disposed between the two castellations. Each slot includes a slot floor and a slot width. The slot width is defined by a distance between the first sidewall of a first castellation and the second sidewall of a second castellation adjacent the first castellation at the second end of the body. The slot width increases with axial or radial distance away from the plasma exit orifice and the slot width is configured to be at least twice the castellation width.

In another aspect, a torch tip for a plasma arc torch is featured. The plasma torch tip can reduce molten spatter buildup during operation of the plasma arc torch, lengthen nozzle life, and increase plasma arc stability. The torch tip comprises a body that includes a first end and a second end. The first end of the body is configured to attach to the plasma arc torch. An end wall is disposed at the second end of the body and a plasma exit orifice is formed in the end wall at the second end of the body. At least two castellations are formed in an exterior surface of the end wall and at least one slot is disposed between the two castellations. Each slot extends between a first sidewall of a first castellation and a second sidewall of a second castellation adjacent the first castellation at the second end of the body. Each slot has a slot floor and an exterior shape. The exterior shape of the slot floor has a generally V-shaped contour that extends between a first point on the first sidewall of the first castellation, a lowermost point of the slot floor, and a second point on the second sidewall of the second castellation.

In yet another aspect, a torch tip is featured. The plasma torch tip can reduce molten spatter buildup during operation of the plasma arc torch, lengthen nozzle life, and increase plasma arc stability. The torch tip comprises a body that includes a first end and a second end. The first end of the body is configured to attach to the plasma arc torch. An end wall is disposed at the second end of the body and a plasma exit orifice is formed in the end wall at the second end of the body. At least two castellations are formed in an exterior surface of the end wall and at least one slot is disposed between the two castellations. Each slot extends between a first sidewall of a first castellation and a second sidewall of a second castellation adjacent the first castellation at the second end of the body. Each slot has a slot floor and an exterior shape. The torch tip having the following characteristics:
   (a) a slope of the slot floor within the at least one slot tapers in an outward radial direction relative to the plasma exit orifice toward the first end of the body, and
   (b) the exterior shape of the at least one slot has a generally U-shaped structure that extends between a first point on the first sidewall of the first castellation and a second point on the second sidewall of the second castellation.

In other examples, any of the aspects above, or any apparatus or method described herein, can include one or more of the following features.

The slot can comprise a slot width defined by a distance between the first sidewall of the first castellation and the second sidewall of a second castellation adjacent the first castellation at the second end of the body, wherein the slot width is at least twice the castellation width. The slot width can increase on an order of at least about one unit with axial distance away from the plasma exit orifice. In some embodiments, the slot width can increase on an order of at least about 1.5 units with axial distance away from the plasma exit orifice. The slot width can increase on an order of at least about two units with radial distance away from the plasma exit orifice. The slot width, when measured along the slot floor, can be about 0.24 inches.

The slot floor can have a slope that tapers toward the first end of the body in an outward radial direction, within the at least one slot. The slot can have a slot floor and an exterior shape. The exterior shape can have a generally V-shaped contour extending between a first point on the first sidewall of the first castellation, a lowermost point of the slot floor, and a second point on the second sidewall of the second castellation. The V-shaped contour can define an angle of about 118 degrees. The V-shaped contour can result from using a cone-shaped tool on the second end of the body.

The slot can have an exterior shape with a generally U-shaped structure that extends between a first point on the first sidewall of the first castellation and a second point on the second sidewall of the second castellation. The exterior shape of the at least one slot can have a widened U-shaped structure, a hemispherical elliptical structure, an oval elliptical structure, or an elliptical structure.

The castellation width can be defined by the distance between the first sidewall and the second sidewall measured across an outer perimeter or an inner perimeter of each castellation. The castellation width, when measured along the radius of the castellation, can be about 0.064 inches.

The ratio of the slot width to the castellation width can be about 2:1. The ratio of the slot width, measured along the slot floor, to the castellation width, measured along the radius of the castellation, can be about 3.5:1.

The torch tip can include three castellations and three slots disposed between the castellations. The torch tip can be a shield.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 12B is a table that includes example slot width, castellation width, and contour angle values that can be used with embodiments described herein.

DETAILED DESCRIPTION

Figure 1:
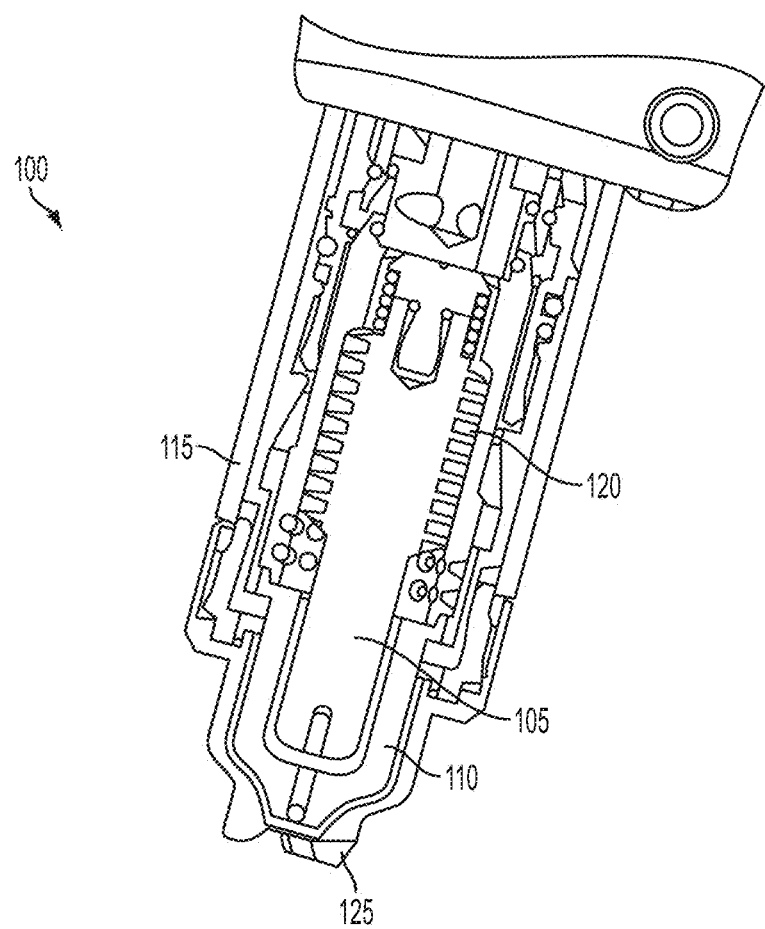
FIG. 1 is a cross-sectional view of a plasma arc torch tip.

FIG. 1 shows a cross-sectional view of a plasma arc torch 100. A plasma torch tip is comprised of a variety of different consumables, for example, an electrode 105, a nozzle 110, a retaining cap 115, a swirl ring 120, or a shield 125. The nozzle 110 has a central exit orifice mounted within a torch body. The torch and torch tip can include electrical connections, passages for cooling, and passages for arc control fluids (e.g., plasma gas). The shield 125 is used to prevent molten spatter from damaging the other components of the torch, for example, the electrode 105, nozzle 110, retaining cap 115, or swirl ring 120. Often, the molten spatter builds up on the shield 125 causing double arcing or melting of the shield 125. The build-up typically increases as the cutting time increases.

Figure 2:
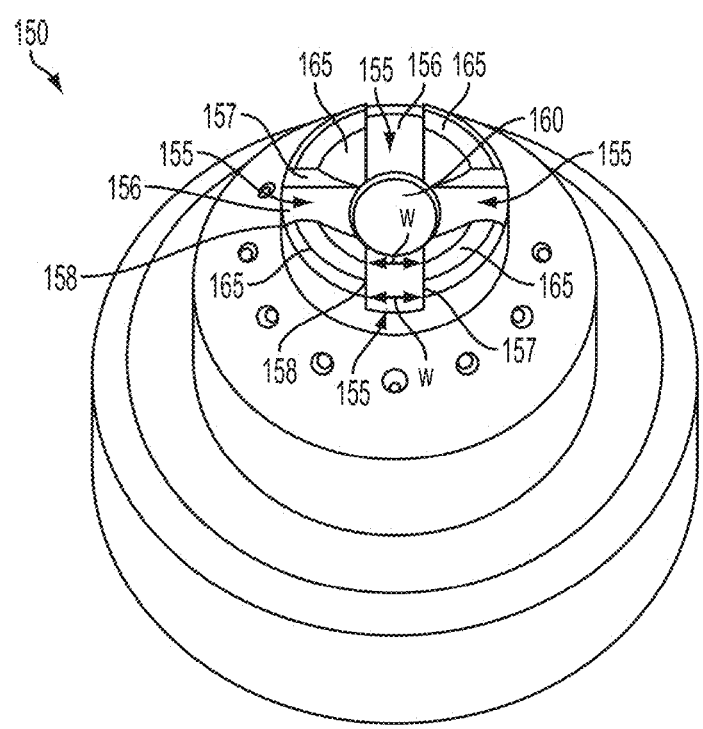
FIG. 2 is a perspective view of a torch tip having four parallel slots.

To decrease the amount of molten spatter buildup on the shield, slots can be added to the shield to create a channel for the molten spatter to exit the shield. FIG. 2 shows a prior art torch tip 150 having four symmetrical vent slots 155. The vent slots 155 are arranged in a symmetrical pattern around the plasma exit orifice 160. The vent slots 155 retain the same profile dimensions as a function of distance from the plasma exit orifice 160. For example, the width w of the slot floor 156 at the plasma exit orifice 160 is the same as the width w of the slot floor 156 at a distance away from the plasma exit orifice 160. In addition, the width of the slots 155 is the same at the plasma exit orifice 160 as the width of the slots 155 at a distance from the plasma exit orifice 160. In other words, the slot walls 157, 158 do not taper and are parallel to each other. These vent slots 155 create a channel that allows the molten spatter to exit the shield. However, these prior art torch tips or shields are inadequate for certain applications and often have substantial molten spatter buildup, which can occupy some or all of the regions of the slots, effectively blocking the channels.

The torch tip 150 also has four castellations 165 that separate each of the slots 155. The castellations 165 absorb the heat generated by the plasma arc torch. Another heat source of the shield is located at the vent surface, where heat can be transferred from the molten spatter to the shield. The more solid mass that is distributed in the castellations the more heat the shield can absorb from the surrounding environment. In addition, the heat capacitance of the material used to make the shield is related to how much heat the shield can absorb from the surrounding environment. A higher heat capacitance can result in better shield performance, because the shield can absorb more heat while remaining at a lower temperature than a shield with a lower heat capacitance. A shield that has a low castellation mass and/or a low heat capacitance can melt prematurely.

To reduce the amount of molten spatter buildup and prevent the torch tip or shield from melting prematurely, a shield can be designed that balances the need to reduce the amount of molten spatter buildup with the mass of the shield castellations to prevent premature melting of the consumable.

Figure 3:
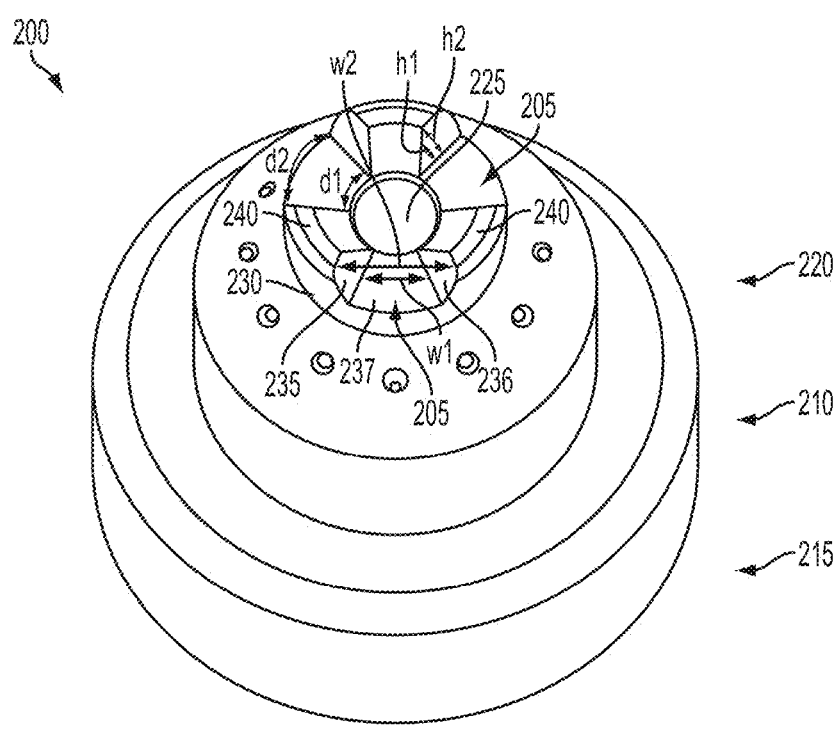
FIG. 3 is a perspective view of a torch tip having three slots, according to an illustrative embodiment of the invention.
Figure 4A:
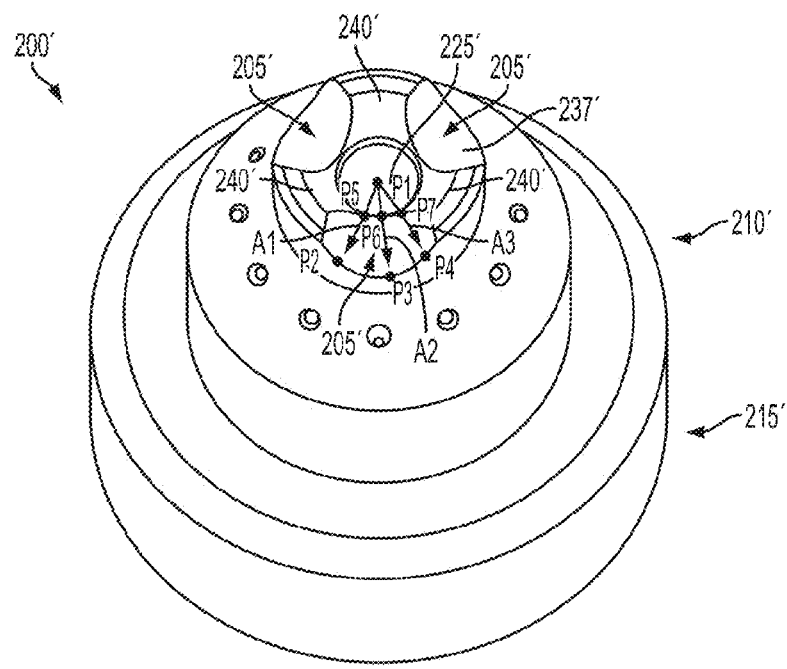
FIG. 4A is a perspective view of a torch tip having three slots with a generally semi-frustoconical geometry, according to an illustrative embodiment of the invention.
Figure 4B:
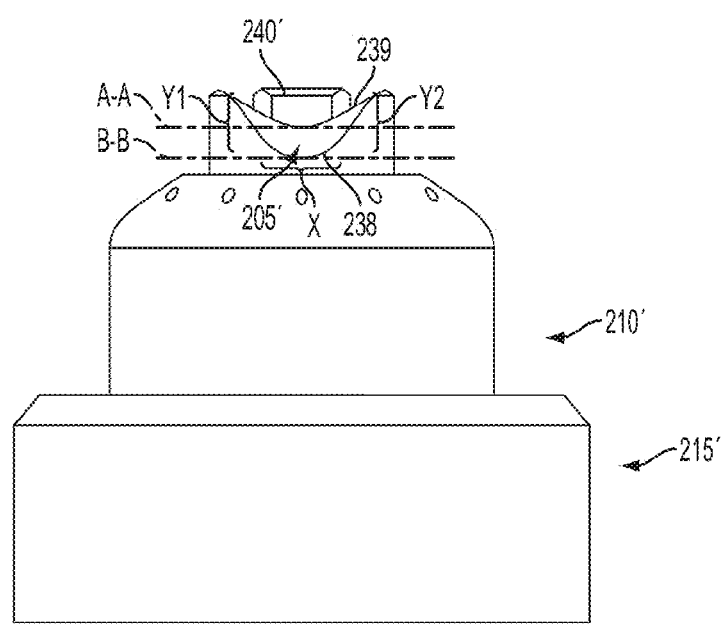
FIG. 4B is a side view of the torch tip shown in FIG. 4A, e.g., a torch tip having three slots with a generally semi-frustoconical geometry, according to an illustrative embodiment of the invention.

FIG. 3 shows a perspective view of a torch tip 200 having three slots 205, according to an illustrative embodiment of the invention. FIG. 4A shows a perspective view of a torch tip 200' having three slots 205' with a generally semi-frustoconical geometry, according to an illustrative embodiment of the invention. FIG. 4B shows a side view of the torch tip 200' shown in FIG. 4A, e.g., a torch tip having three slots 205' with a generally semi-frustoconical geometry, according to an illustrative embodiment of the invention. Referring to FIG. 3, the torch tip 200 includes a body 210, having a first end 215 and a second end 220. The torch tip also includes an end wall 230 disposed at the second end 220 of the body 210. A plasma exit orifice 225 is formed in the end wall 230 at the second end 220 of the body 210. The first end 215 of the body 210 is configured to attach to a plasma arc torch (such as the torch shown in FIG. 1). The torch tip 200 can attach to a plasma arc torch using any fastening mechanism, for example, threads, friction fit, press fit, etc.

The torch tip 200 also includes at least two castellations 240 formed in the end wall 230. The castellations can be generally rectangular in nature or the castellations can be curved, e.g., crenulations. In some embodiments, the castellations can be crenulations or a standoff. At least one slot 205 is disposed between two castellations 240. Each slot is defined by three sides, a first castellation wall 235, a second castellation wall 236 and a slot floor 237. The first castellation wall 235 and the second castellation wall 236 are opposite each other. Referring to FIG. 4B, when the slot 205' has a curved, rounded, generally semi-cylindrical, or generally semi-frustoconical geometry, the slot floor can be located in the lower portion of the slot, for example, in region X, and the first and second castellation walls can be located in the upper regions of the slot, for example, in regions Y1 and Y2.

The torch tip 200, and more particularly the slots 205, can have at least one of two characteristics. The first characteristic is that a slope of the slot floor 237 within the at least one slot 205 tapers in an outward radial direction relative to the plasma exit orifice 225 toward the first end 215 of the body 210. For example, the slot floor 237 tapers toward the first end 215 of the body 210 as a function of distance away from the plasma exit orifice 225 such that a first location on an outer edge of the slot floor 237 (e.g., the edge of the slot floor 237 that is farthest away from the plasma exit orifice 225) is closer to the first end 215 of the torch tip 200 than a second location on an inner edge of the slot floor 237 (e.g., the edge of the slot floor that is closest to the plasma exit orifice 225). Referring to FIG. 4A, a first location P2, P3, P4 on an outer edge of the slot floor 237' is closer to the first end 215' of the torch tip 200' than a second location P5, P6, P7 on an inner edge of the slot floor 237'. The first P2, P3, P4 and second P5, P6, P7 locations can be axially aligned relative to an axis A1, A2, A3 extending from a center P1 of the plasma exit orifice 225'. For example, axis A1 contains first location P2 on the outer edge of the slot floor 237', second location P5 on the inner edge of the slot floor 237', and a center P1 of the plasma exit orifice 225'. Axis A2 contains first location P3 on the outer edge of the slot floor 237', second location P6 on the inner edge of the slot floor 237', and a center P1 of the plasma exit orifice 225'. Axis A3 contains first location P4 on the outer edge of the slot floor 237', second location P7 on the inner edge of the slot floor 237', and a center P1 of the plasma exit orifice 225'. In other words, referring to FIG. 4B, the slot floor tapers in a downward direction toward the first end 215' of the body 210', tapering away from the plane A-A (e.g., the plane A-A is perpendicular to the sheet of paper) that contains the inner edge 239 of the slot floor. The outer edge 238 of the slot floor is in a different plane B-B (e.g., the plane B-B is perpendicular to the sheet of paper) than the plane A-A that contains the inner edge 239 of the slot floor. For example, referring to FIG. 3, the slot floor 237 located in the end wall 230 can be shaped like a bowl or a turtle shell, with its highest point in the region of the plasma exit orifice 225.

Still referring to FIG. 3, the second characteristic is that a distance between the first castellation wall 235 and the second castellation wall 236 along the slot floor 237 increases with distance away from the plasma exit orifice 225. For example, distance d1 (e.g., the distance between the first castellation wall 235 and the second castellation wall 236 as measured at the slot floor 237 near the plasma exit orifice 225) is less than distance d2 (e.g., the distance between the first castellation wall 235 and the second castellation wall 236 as measured at the slot floor 237 farthest away from the plasma exit orifice 225).

In one embodiment, the torch tip 200 can have the first characteristic. In another embodiment, the torch can have the second characteristic. In another embodiment, the torch tip 200 can have both the first characteristic and the second characteristic.

In yet another embodiment, the torch tip 200 can have a third characteristic. The distance between the first castellation wall 235 and the second castellation wall 236 can increase with distance away from the slot floor 237. For example, the first castellation wall 235 and the second castellation wall 236 can taper such that the distance w1 between the first castellation wall 235 and the second castellation wall 236 at the slot floor 237 is less than the distance w2 between the first castellation wall 235 and the second castellation wall 236 at a location away from the slot floor 237.

In some embodiments, the torch tip 200 can include all three characteristics or any combination thereof. For example, the torch tip can have the first and third characteristic or the second and third characteristic.

In some embodiments, the height of the first and second castellation walls 235, 236 increases with distance from the exit orifice. For example, the height h1 of the first castellation wall 235 and the second castellation wall 236 at a location close to the plasma exit orifice 225 is shorter than the height h2 of the first castellation wall 235 and the second castellation wall 236 at a location farther away from the plasma exit orifice 225.

In some embodiments, the torch tip 200, 200' is a shield. The torch tip 200, 200' or shield can be made from a material having a high thermal conductivity, for example, copper.

As shown in FIGS. 3 and 4A, the torch tip 200, 200' can have three slots, 205, 205', respectively. In this embodiment, the torch tip 200, 200' has three slots 205, 205' and three castellations 240, 240', respectively. Each castellation 240, 240' can separate two of the three slots 205, 205'. In some embodiments, each castellation 240, 240' has a substantially planar top surface. The slots 205, 205' and castellations 240, 240' can be arranged in a symmetrical pattern around the plasma exit orifice 225, 225', respectively.

The slots 205, 205' can have a rounded, generally semi-cylindrical, or generally semi-frustoconical geometry. For example, the slots 205' have a generally semi-frustoconical geometry as shown in FIGS. 4A and 4B. In general, the slots 205, 205' can have any other type of geometry that is conducive to reducing the amount of molten spatter buildup during operation of a plasma arc torch.

In some embodiments, the shield has no more than three slots each having a generally semi-frustoconical geometry. In some embodiments, the torch tip or shield has exactly three slots and three castellations. In some embodiments, the slots 205, 205' extend radially from the plasma exit orifice 225, 225', respectively.

Figure 5A:
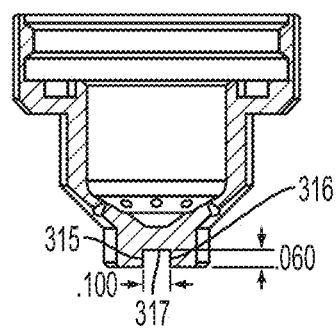
FIG. 5A is a cross-sectional view of the torch tip of FIG. 2.
Figure 5B:
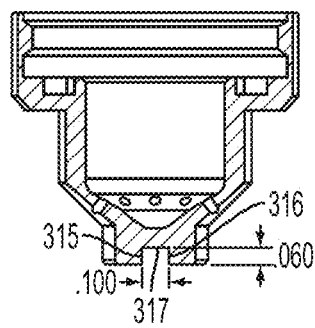
FIG. 5B is a cross-sectional view of the torch tip of FIG. 2.
Figure 5C:
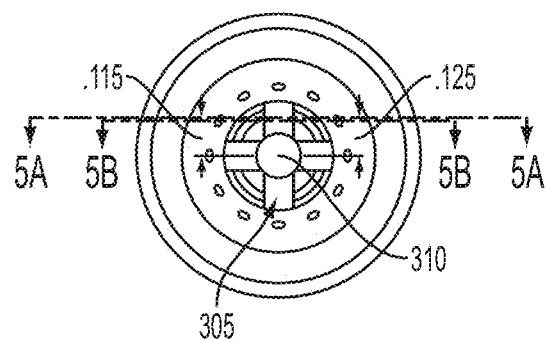
FIG. 5C is a top view of the torch tip of FIG. 2.
Figure 6A:
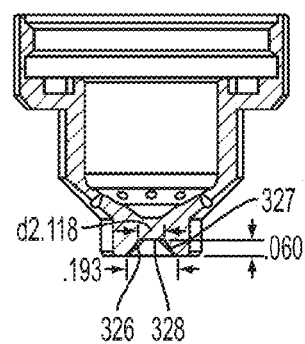
FIG. 6A is a cross-sectional view of the torch tip of FIG. 3, according to an illustrative embodiment of the invention.
Figure 6B:
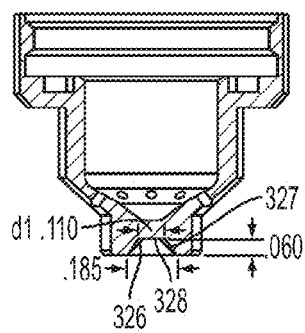
FIG. 6B is a cross-sectional view of the torch tip of FIG. 3, according to an illustrative embodiment of the invention.
Figure 6C:
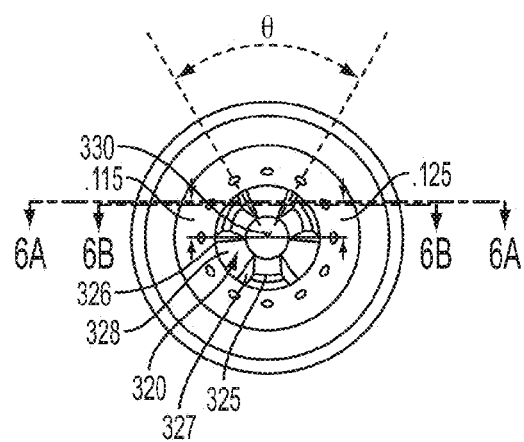
FIG. 6C is a top view of the torch tip of FIG. 3, according to an illustrative embodiment of the invention.
Figure 7A:
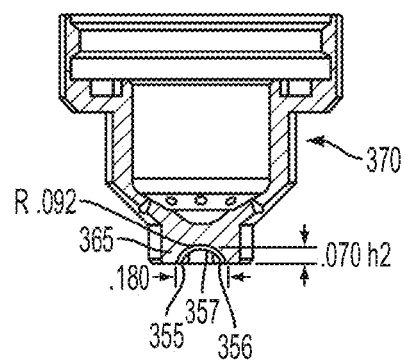
FIG. 7A is a cross-sectional view of the torch tip of FIG. 4A, according to an illustrative embodiment of the invention.
Figure 7B:
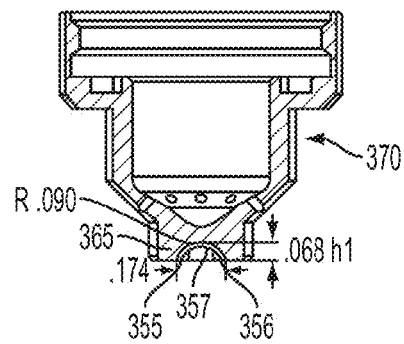
FIG. 7B is a cross-sectional view of the torch tip of FIG. 4A, according to an illustrative embodiment of the invention.
Figure 7C:
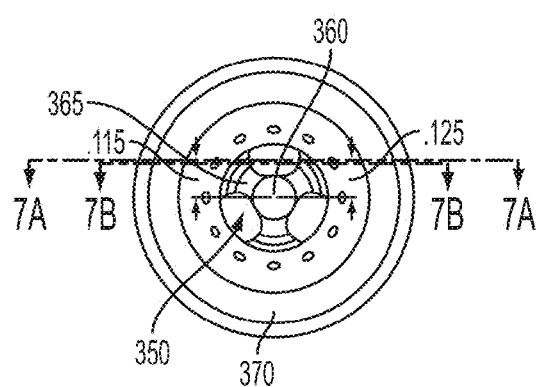
FIG. 7C is a top view of the torch tip of FIG. 4A, according to an illustrative embodiment of the invention.

FIGS. 5A-5C are schematic illustrations, including side views and a top view, of the torch tip of FIG. 2. FIGS. 6A-6C are a schematic illustrations, including side views and a top view, of the torch tip of FIG. 3, according to an illustrative embodiment of the invention. FIG. 7A-7C are schematic illustrations, including side views and a top view, of torch tip of FIG. 4, according to an illustrative embodiment of the invention.

FIGS. 5A-5C, 6A-6C, and 7A-7C provide additional details about the shields in FIGS. 2, 3, and 4, respectively. As shown in FIGS. 5A-5C, the prior art shield has four slots 305 that are arranged symmetrically around the plasma exit orifice 310. The slots 305 are not curved or tapered. The slots 305 are instead generally semi-rectangular and the castellation walls 315, 316 form right angles with the slot floor 317. The slot floor 317 of the shield is generally flat. This slot geometry is not optimal because molten spatter can easily build up in the slot, particularly, the molten spatter can build up where the castellation walls 315, 316 meet the slot floor 317.

Still referring to FIGS. 5A-5C, the slot geometry does not change based on the distance from the plasma exit orifice 310. FIG. 5A represents the cross-section of the torch tip labeled 5A in FIG. 5C and FIG. 5B represents the cross-section of the torch tip labeled 5B in FIG. 5C. Section 5B is slightly closer to the central exit orifice 310 than section 5A. Comparing section 5B to section 5A, the geometry does not change. For example, the depth of the slot is 0.060 in both sections 5A and 5B. In addition, the distance between the first and second castellation walls 315, 316 is 0.100 inches in both sections 5A and 5B.

As shown in FIGS. 6A-6C and 7A-7C, the number of slots and the slot geometry has been modified to optimize the performance and life of the shield. As shown, the shields have three slots 320 and three castellations 325. Comparing FIGS. 6A-6C with FIG. 5A-5C, the castellation walls 326, 327 of the shield of FIGS. 6A-6C are tapered such that a distance between the first and second castellation walls 326, 327 along the slot floor 328 increases with distance away from the plasma exit orifice 330 (e.g., the distance d1 is less than the distance d2). The castellation walls 326, 327 are also tapered such that the distance between the castellation walls 326, 327 increases with distance away from the slot floor 328 (e.g., the width w1 is less than the width w2).

Referring to FIGS. 6A-6C, the first and second castellation walls 236, 327 and the slot floor 328 have an angle θ from about 45 arc degrees to about 75 arc degrees about the end wall. In some embodiments, the first and second castellation walls 236, 327 and the slot floor 328 have an angle θ of about 60 arc degrees about the end wall.

As shown in FIGS. 6A-6C, the slot geometry changes based on the distance from the plasma exit orifice 330. FIG. 6A represents the cross-section of the torch tip labeled 6A in FIG. 6C and FIG. 6B represents the cross-section of the torch tip labeled 6B in FIG. 6C. Section 6B is slightly closer to the plasma exit orifice 330 than Section 6A. The distance between the castellation walls 326, 327 increases with distance from the plasma exit orifice 330. The distance between the castellation walls 326, 327 at the slot floor 328 in section 6B is 0.110 and that distance increases to 0.118 in section 6A. In addition, the distance between the castellation walls 326, 327 at a distance away from the slot floor 328 also increases with distance from the plasma exit orifice 330, for example, the distance increases from 0.185 in section 6B to 0.193 in section 6A. The depth of the slot remains constant in this embodiment, at 0.060 inches in both sections 6A and 6B.

FIGS. 7A-7C shows another embodiment of the invention. The slot 350 is generally semi-frustoconical in geometry. Similar to FIGS. 6A-6C, the distance between the castellation walls 355, 356 increases at both the slot floor 357 and at a distance away from the slot floor 357 with distance away from the plasma exit orifice 360. FIG. 7A represents the cross-section of the torch tip labeled 7A in FIG. 7C and FIG. 7B represents the cross-section of the torch tip labeled 7B in FIG. 7C. For example, section 7B is slightly closer to the plasma exit orifice 360 than section 7A. The radius of the generally semi-frustoconsical slot increases with distance from the plasma exit orifice, for example, the radius is 0.090 in section 7B and the radius increases to 0.092 in section 7A. In addition, the distance between the castellation walls 355, 356 at a distance away from the slot floor 357 also increases with distance from the plasma exit orifice 360, for example, the distance increases from 0.174 in section 7B to 0.180 in section 7A. In addition, the height of the slot 350 also increases with distance from the plasma exit orifice 360 (e.g., the height h1 is less than the height h2). For example, in section 7B, the distance from the slot floor 357 to the top of the castellation 365 is about 0.068. In section 7A, this distance increases to 0.070. This indicates that the slot floor is tapered toward the shield body 370 with distance away from the plasma exit orifice 360. Another indication that the slot floor tapers with distance away from the plasma exit orifice is shown in 4B. The slot floor tapers in an outward radial direction relative to the plasma exit orifice toward the first end 215' of the body 210'. Thus, the slot floor tapers away from the plane A-A that contains the inner edge 239 of the slot floor. The outer edge 238 of the slot floor is in a different plane B-B than the plane A-A that contains the inner edge 239 of the slot floor.

Figure 8:
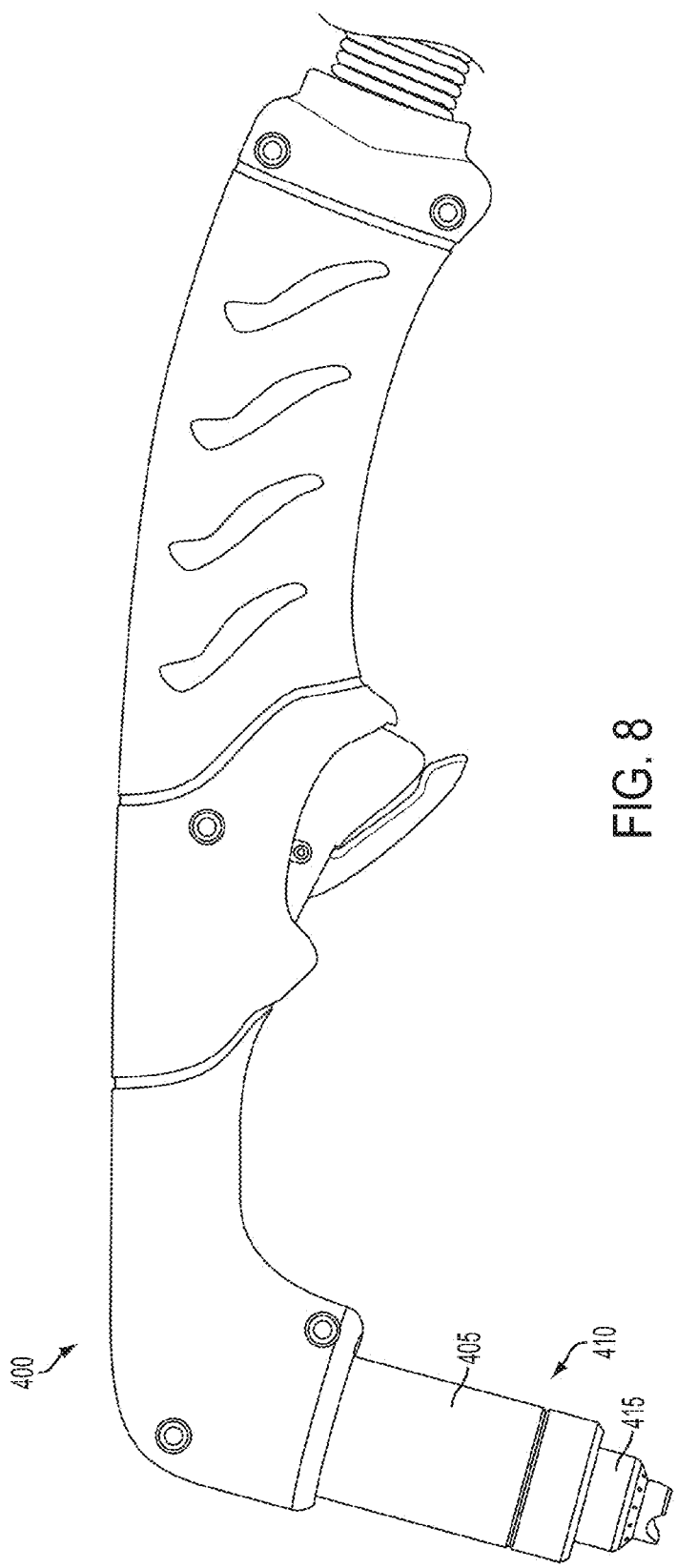
FIG. 8 is a schematic illustration of a plasma arc torch system, according to an illustrative embodiment of the invention.

The invention in another aspect features a plasma arc torch system. FIG. 8 is a schematic illustration of a plasma arc torch system 400, according to an illustrative embodiment of the invention. The torch system includes a torch body 405 that defines a plasma gas flow path for directing a plasma gas to a plasma chamber in which a plasma arc is formed. An electrode (not shown) is disposed within the torch body 405. The electrode can be, for example, the electrode 105 of FIG. 1. A nozzle (not shown) is disposed relative to the electrode at a distal end 410 of the torch body 405. The nozzle can be, for example, nozzle 110 of FIG. 1. The torch system 400 also includes a shield 415 disposed relative to an exterior surface of the nozzle at the distal end 410 of the torch body 405. The shield can be, for example, any of the embodiments of the shield or torch tip described above with reference to FIG. 3, 4A, 4B, 6A-6C, or 7A-7C.

A torch tip or shield as described with reference to FIG. 3, 4A, 4B, 6A-6C, or 7A-7C reduces molten spatter buildup during operation of the plasma arc torch. In addition, the torch tip or shield is easier to clean than the torch tip or shield described with reference to FIG. 2 or 5A-5C. Furthermore, the torch tip or shield as described with reference to FIG. 3, 4A, 4B, 6A-6C, or 7A-7C does not melt as easily or quickly as the torch tip or shield described with reference to FIG. 2 or 5A-5C. These benefits can be achieved by the balance between the number of the slots, the slot shape and geometry and the number of castellations and the mass of the castellations.

Improved performance of the shields illustrated in FIGS. 3, 4A and 4B over the shield illustrated in FIG. 2 can be shown by comparing the amount of molten spatter each shield accumulates under set conditions. For example, the shields illustrated in FIGS. 2, 3, and 4A and B were tested using a robot to pierce perpendicular to the work piece while directly contacting the material during cutting (e.g., 0" standoff), with each shield repeated 30 times. After each pierce cut, the shields were weighed to monitor the weight gain of the present slag.

Figure 9:
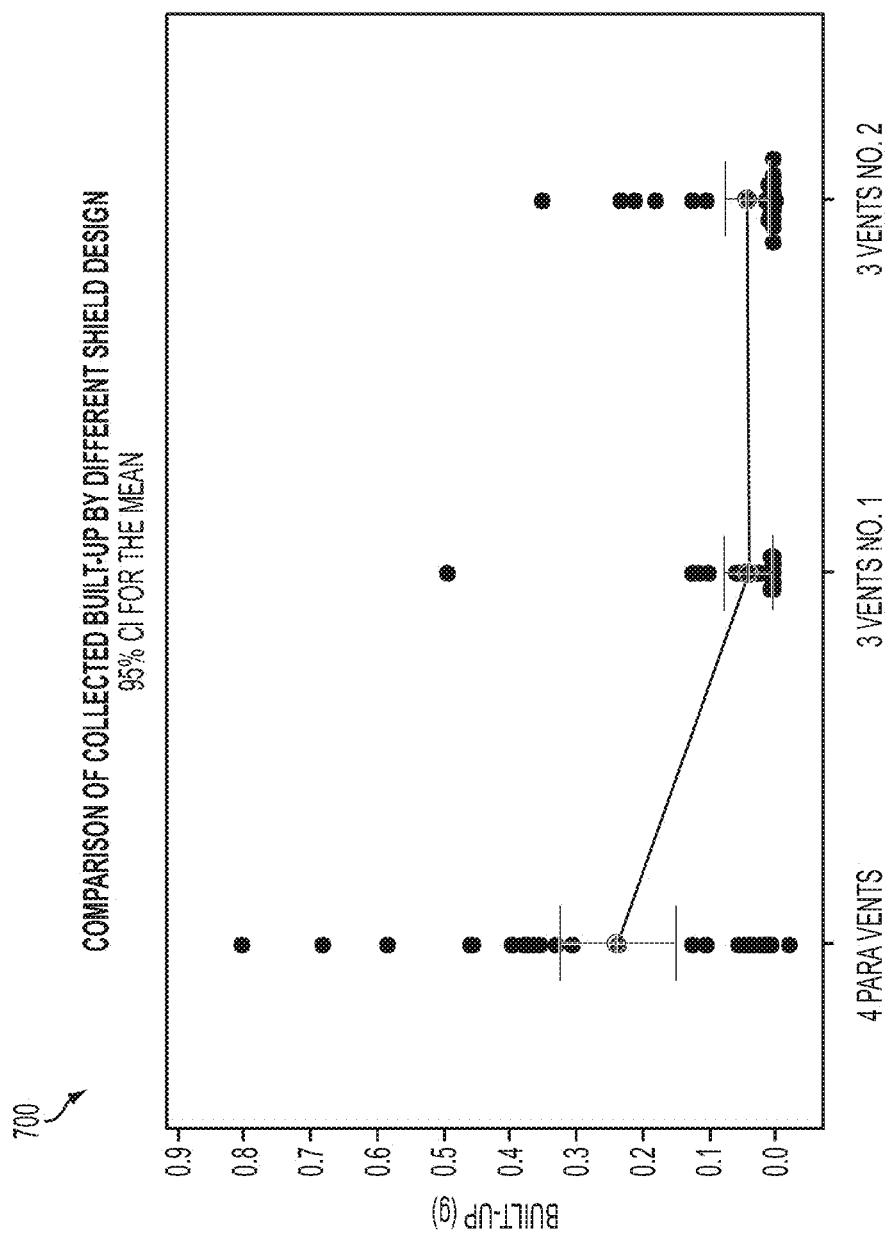
FIG. 9 is a graph of molten spatter buildup on each of the three torch tips shown in FIGS. 2, 3, and 4A.

FIG. 9 is a graph 700 of molten spatter buildup on each of the three torch tips shown in FIGS. 2, 3, and 4A and B, showing the results of the example described above. The shield illustrated in FIG. 2, labeled "4 Para Vents" on FIG. 9, with four vent slots, showed the most slag buildup. The average slag buildup for the shield illustrated in FIG. 2 was about 0.25 grams. In contrast, the average slag buildup for the shields illustrated in FIG. 3, labeled "3 Vents No. 1", and the shield illustrated in FIGS. 4A and B, labeled "3 Vents No. 2", was about 0.05 grams. The shields of FIGS. 3, 4A and 4B reduced about 80% of the slag buildup of the shield of FIG. 2.

Figure 10:
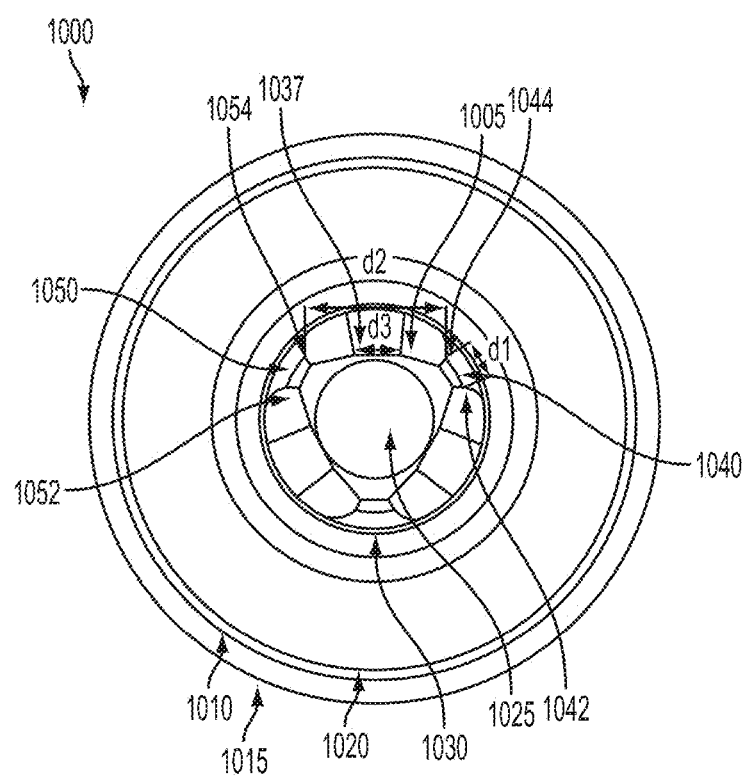
FIG. 10 is perspective view of a torch tip having three slots, according to an illustrative embodiment of the invention.

FIG. 10 is perspective view of a torch tip 1000 having three slots, according to an illustrative embodiment of the invention. The torch tip 1000 includes a body 1010, having a first end 1015 and a second end 1020. The torch tip also includes an end wall 1030 disposed at the second end 1020 of the body 1010. A plasma exit orifice 1025 is formed in the end wall 1030 at the second end 1020 of the body 1010. The first end 1015 of the body 1010 is configured to attach to a plasma arc torch (such as the torch shown in FIG. 1). The torch tip 1000 can attach to a plasma arc torch using any fastening mechanism, for example, threads, friction fit, press fit, etc.

The torch tip 1000 includes at least two castellations 1040, 1050 formed in the end wall 1030. Castellations are often generated by placing a cutting tool at a point positioned between a first sidewall 1044 of a first desired castellation 1040 and a second sidewall 1054 of a second desired castellation 1050 and moving the cutting tool to at least one of a specific location relative to a central axis of the shield or along a tool path. In some embodiments, the tool path can be moved along a path such that it generates a contour. The contour can be a generally V-shaped or a generally U-shaped contour.

Torch shield castellations 1040, 1050 can have various shapes. For example, the castellations can be configured such that they are generally rectangular in nature or curved (e.g., crenulations). The shape of the castellations can be varied to increase drag cutting life. For example, in some embodiments disclosed herein, a torch tip castellation 1040, 1050 can be configured such that it has a structure in which the inner diameter of the castellation (the diameter closer to the first end 1015 of the torch tip body 1010) is larger than the outer diameter of the castellation (the diameter closer to the second end 1020 of the torch tip body 1010).

Figure 11:
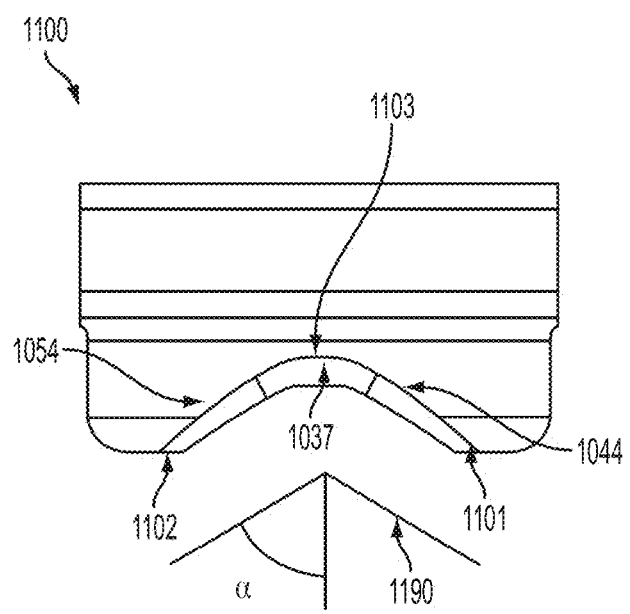
FIG. 11 is side view of a torch tip having a slot with a generally V-shaped contour, according to an illustrative embodiment of the invention.

In some embodiments, castellations can be generated using a cone-shaped (e.g., conical) tool (not-shown). The cone-shaped tool can be placed at a point on the end wall 1030 where one wishes to generate the first sidewall 1044 of a first castellation 1040 and moved relative to a central axis of the shield to a second point on the end wall 1030 where one wishes to generate the second sidewall 1054 of a second castellation 1050. An example of such tool path is shown in FIG. 11, where a cone tool is used to generate the contour extending between a first point 1101, a middle point 1103, and a second point 1102. The lines generally referenced by reference number 1190 are used to generally show an example of a path that can be followed by the cone tool to generate the generally V-shaped contour shown in FIG. 11.

Castellations generated using a cone tool, as described herein, can have a shape that varies relative to the central axis of the shield, as the castellation transitions away from the first end of the body 1015 toward the second end of the body 1020. In practice, torch tips having castellations generated using the cone-shaped tool as described herein (i.e., castellations cut from the side) are shown to have an increased drag cut life time of up to 8 arc hours. This is in contrast to torch tips having castellations cut using traditional cutting techniques (i.e., castellations cut from a midpoint between the two castellations) which have a drag cut life time of about 1 arc hour. The cone tool can be applied to the second end of the body 1020 at various angles and can be positioned at a specific point relative to the central axis of the shield. For example, in some embodiments, the cone tool can have a taper/cone angle of about 30 degrees to the second end of the body 1020.

Each torch tip castellation 1040 has a castellation width that is defined by the distance between the first sidewall of that castellation 1042 and the second sidewall of that castellation 1044. The distance defining the castellation width (i.e., the distance between the sidewalls) can be measured at various locations along the castellation. For example, the distance between the first sidewall 1042 and the second sidewall 1044 can be measured across the inner perimeter of the castellation, across the outer diameter of the castellation (distance d1 in FIG. 10), or along the radius of the castellation. The castellation width along the radius of the castellation can be measured proximate the axial extent of the castellation and about a circumferential radius of the plasma exit orifice 1025. For example, the castellation width can be the width measured between an inner perimeter and outer diameter of the castellation.

The torch tip 1000 further includes at least one slot 1005 disposed between two castellations 1050, 1040. Each slot 1005 is defined by three sides: a first sidewall 1044 of a first castellation 1040, a second sidewall 1054 of a second castellation 1050, and a slot floor 1037. The first sidewall 1044 of the first castellation 1040 and the second sidewall 1054 of the second castellation 1050 are substantially opposite each other. As noted previously with reference to FIG. 4B, when the slot 1005 has a curved, rounded, generally semi-cylindrical, or generally semi-frustoconical geometry, the slot floor can be located in the lower portion of the slot 1005 (for example, region X in FIG. 4B) and the first and second castellation walls can be located in the upper regions of the slot (for example, regions Y1 and Y2 in FIG. 4B).

Each torch tip slot 1005 can have a slot width that is defined by the distance between the first sidewall 1042 of the first castellation 1040 defining the torch tip slot 1005 and the second sidewall 1054 of the second castellation 1050 defining the torch tip slot 1005. The distance defining the slot width (i.e., the distance between the sidewalls 1044, 1054) can be measured at various locations along the slot. For example, the distance between the first sidewall 1044 and the second sidewall 1054 can be measured across the inner perimeter of the slot (distance d3 in FIG. 10), across the outer diameter of the slot 1005 (distance d1 in FIG. 10), or along the radius of the slot. Slot width measurements obtained along the radius of the slot can be obtained proximate the axial extent of the slot and about a circumferential radius of the plasma exit orifice 1025. For example, the slot width can be the width measured between an inner perimeter and outer diameter of the slot.

The torch tip can have a number of characteristics including those already described in relation to FIGS. 1-9 and a number of additional characteristics outlined below. In some embodiments, the torch tip can have only one of these characteristics. In other embodiments, the torch tip can have two or more of these characteristics.

As described previously in relation to FIG. 4A, the slot floor 1037 within the at least one slot 1005 can have a slope that tapers in an outward radial direction relative to the plasma exit orifice 1025 toward the first end 1015 of the body 1010. Specifically, as shown in FIG. 10, the slot floor 1037 can taper toward the first end 1015 of the body 1010 as a function of distance away from the plasma exit orifice 1025 such that a first location on an outer edge of the slot floor 1037 (e.g., the edge of the slot floor 1037 that is farthest away from the plasma exit orifice 1025) is closer to the first end 1015 of the torch tip 1000 than a second location on an inner edge of the slot floor 1037 (e.g., the edge of the slot floor that is closest to the plasma exit orifice 1025).

The slot 1005 can further have a width that is at least twice the width of at least one of its adjacent castellations 1040, 1050. For example, in the embodiment shown in FIG. 10, the slot 1005 has a width d2 (when measured along the projection of slot width on the second end of the shield) that is at least twice the width d1 of its adjacent castellation 1040 (when measured along the radius of the castellation, e.g., d1). The ratio of slot width d2, to castellation width d1, measured along the radius of the castellation, can be more than 2:1. For example, in some embodiments, the ratio of the slot width d2, to castellation width d1, measured along the radius of the castellation, can be about or more than 3.5:1. In one embodiment, the slot width can be about 0.24 inches and the castellation width, measured along the radius of the castellation, can be about 0.064 inches. Other ratios of slot width d2 to castellation width d1 can be utilized with the embodiments disclosed herein.

In some embodiments, the slot width can increase with axial or radial distance away from the plasma exit orifice 1025. For example, the slot width can increase on an order of at least about one unit with axial distance away from the plasma exit orifice 1025 and/or on an order of at least about two units with radial distance away from the plasma exit orifice. In some embodiments, the slot width can increase on an order of at least about 1.5 units with axial distance away from the plasma exit orifice.

Each slot 1005 can further have an exterior shape. The exterior shape of each slot can have a contour. FIG. 11 is a side view of a torch tip 1100 having a slot 1005 with a generally V-shaped contour, according to an illustrative embodiment of the invention. As shown in FIG. 11, the slot contour can extend between a first point 1101 on the first sidewall 1044, a lowermost point 1103 on the slot floor 1037, and a second point 1102 on the second sidewall 1054. The exterior shape of the slot 1005 can have a generally V-shaped contour. The V-shaped contour can define various angles, α, with the central axis of the torch tip. The angle α can have various values. For example, in one embodiment, angle α can be about 59 degrees, such that the contour extending between the first point 1101, the lowermost point 1103, and the second point 1102 defines an angle of about 118 degrees. In some embodiments, the exterior shape of the contour can be generally frustoconical. The corners of the frustoconical contour can be rounded.

Figure 12A:
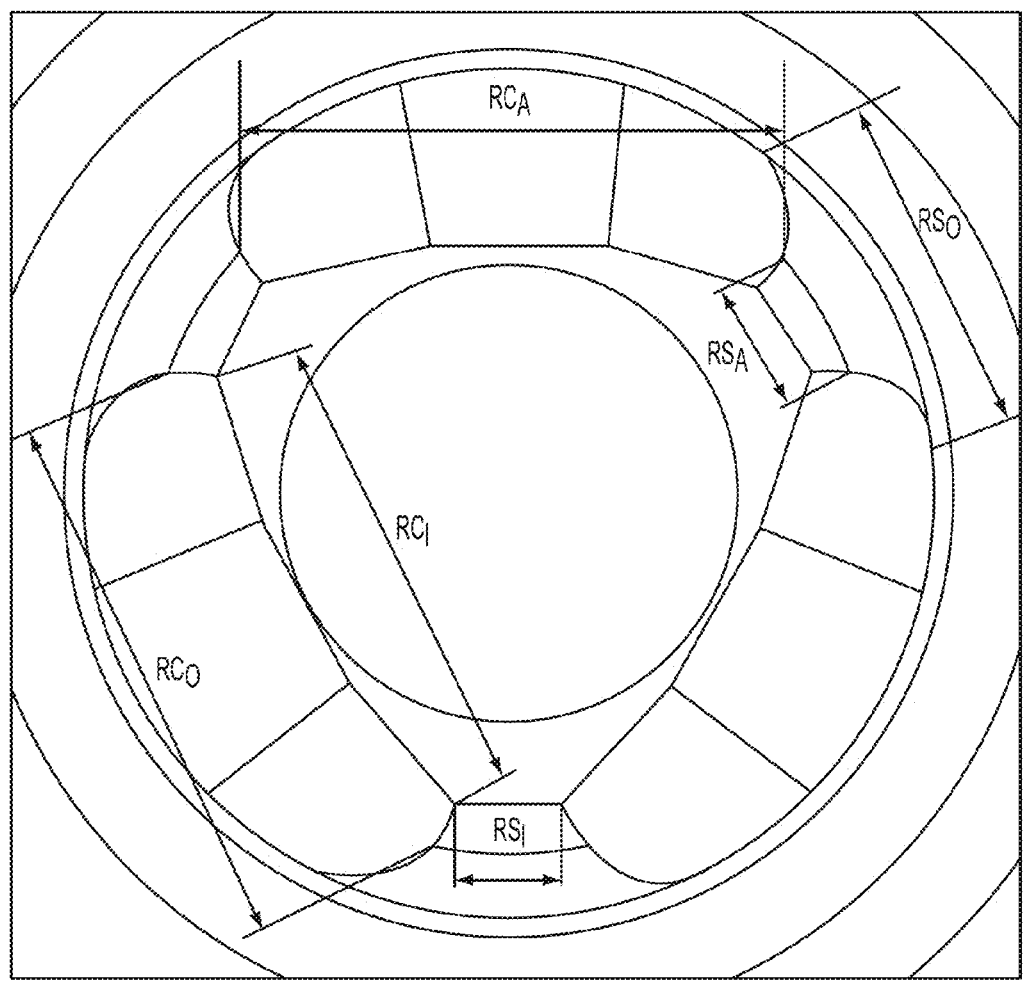
FIG. 12A is perspective view of a torch tip having three slots that illustrates examples of how the slot and castellation width values can be measured.

As described above, castellation and slot width values can be measured across the inner perimeters of the castellations and/or slots, along the radius of the castellations and/or slots, and/or across the outer perimeter of the castellations and/or slots. FIG. 12A is a perspective view of a torch tip having three slots that illustrates examples of how slot and castellation width values can be measured. Specifically, arrows denoted by $RC_I$ and $RS_I$ demonstrate an example of how castellation width ($RC_I$) and slot width ($RS_I$) measurements can be obtained across the inner perimeters of the torch tip castellations and slots. Similarly, arrows denoted by $RC_O$ and $RS_O$ demonstrate an example of how castellation width ($RC_O$) and slot width ($RS_O$) measurements can be obtained across the outer perimeters of the torch tip castellations and slots. Finally, arrows denoted by $RC_A$ and $RS_A$ demonstrate an example of how castellation width ($RC_A$) and slot width ($RS_A$) measurements can be obtained along the radius of the castellations and/or slots.

FIG. 12B is a table that includes example slot width, castellation width, and contour angle values that can be used with embodiments described herein. The values shown in FIG. 12B are obtained by drag cutting (a close analog to hand cutting). A workpiece of ⅜" thick mild steel is used. Drag hand shield cutting can be performed on a cut table and using a robot to simulate hand cutting. Test results indicate that the slot width to castellation width ratio is an important factor for improving nozzle life. The results shown in FIG. 12B further indicate that a more diffused shield flow can help to stabilize the plasma arc and increase the nozzle life, which is sensitive to diffusion near the shield drag surface. Slots possessing a V-shaped or near-V shaped contour (FIG. 11) can also increase robust drop cut performance over a slot having a near-U shaped contour (described later with reference to FIG. 13). Greater constriction near the nozzle outlet can also help to improve drop cut performance (e.g., as seen in FIG. 11 and to a lesser extent in FIG. 13). In the first example (Example 1), the ratio of slot width to castellation width varies from about 2.074 to about 5.286 depending on where the measurements for slot and castellation width are obtained (e.g., across the outer perimeters, along the surface, or across the inner perimeters). In this example, the contour extending along the slot defines an angle of about 124 degrees. In this example, cutting is performed at a maximum speed of about 21 inch per meter. The torch shield of this example is also used to cut 20 strips of workpiece at a cut speed of about 20 inches per meter and a drop cut rate is calculated by recording if the strip drops down after the cut without any tool or external force applied. In this example, when applied at a speed of 20 in per minute, a drop cut rate of 0% is observed.

In the second example (Example 2), the ratio of slot width to castellation width varies from about 1.667 to about 3.185 depending on where the measurements for slot and castellation width are obtained. In this example, the contour extending along the slot defines an angle of about 122 degrees. This example is presented to demonstrate that depending on how the width measurements are obtained (e.g., across the outer perimeters, along the surface, or across the inner perimeters), in some embodiments, the ratio of slot width to castellation width may be less than 2. For example, in Example 2, the ratio of castellation width to slot width when measured along the outer perimeters of the slot and castellation is less than 2. However, this ratio when measured at other locations (e.g., along the surface or across the inner perimeters) is at least 2. In this example, when cutting is performed at a speed of about 21 inch per meter, the life expectancies of the torch consumables (e.g., life expectancy of the torch nozzle and shield) are improved by 2.2 arc hours. A drop cut rate of 80% is observed when cutting 20 strips of workpiece at a cut speed of about 20 inches per minute. A drop cut of 80% indicates that 4 out of 20 strips did not drop at the end of cutting using the torch shield of this example at the indicated speed.

In the third example (Example 3), the ratio of slot width to castellation width varies from about 2.745 to about 5.023 depending on where the measurements for slot and castellation width are obtained. In this example, the contour extending along the slot defines an angle of about 119 degrees. In this example, when cutting is performed at a speed of about 21 inch per meter, the life expectancies of the torch consumables (e.g., life expectancy of the torch nozzle and shield) are improved by 8.2 arc hours. A drop cut rate of 100% indicates that 0 out of 20 strips did not drop at the end of cutting using the torch shield of this example, at a cut speed of 20 inches per minute.

Figure 13:
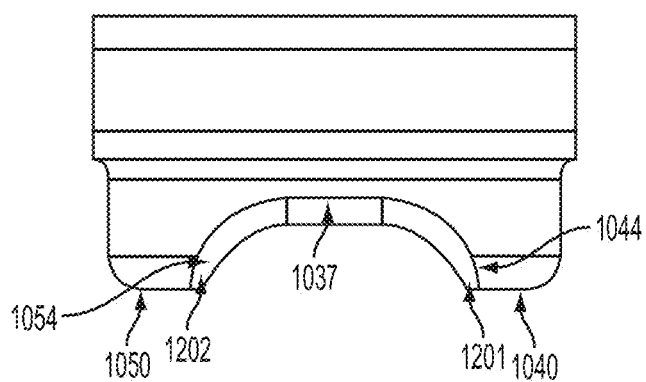
FIG. 13 is side view of a torch tip having a slot with a generally U-shaped contour, according to an illustrative embodiment of the invention.

FIG. 13 is side view of a torch tip having a slot with a generally U-shaped contour, according to an illustrative embodiment of the invention. As described above, each slot 1037 can further have an exterior shape and the exterior shape of each slot 1037 can have a contour. In some embodiments, this contour can be a contour that extends between a first point 1201 on the first sidewall 1044 of the first castellation 1040 and a second point 1202 on the second sidewall 1054 of the second castellation 1050.

As shown in FIG. 13, the contour extending between the first point 1201 on the first sidewall 1044 of the first castellation 1040 and the second point 1202 on the second sidewall 1054 of the second castellation 1050 can define a generally U-shaped structure. In some embodiments, the generally U-shaped structure can be widened such that it defines a widened U-shaped structure. The contour can have other structures. For example, the contour can have a generally hemispherical elliptical structure, an oval elliptical structure, or an elliptical structure.

Most presently available torch systems utilize a torch shield design in which the ratio of slot width to castellation width is about 1:1. Such torch systems often have a nozzle life span of about less than one arc hours. By increasing the ratio of slot width to castellation width and/or varying the contour of the exterior shape of the slots, embodiments described herein are shown to improve arc constriction, reduce slag accumulation and increase the nozzle life span to about eight arc hours. The shield designs described herein increase the diffusion of the shield flow, resulting in having a denser concentration of plasma gas near the nozzle outlet, and creating a robust drop cut.

Figures 14A, 14B:
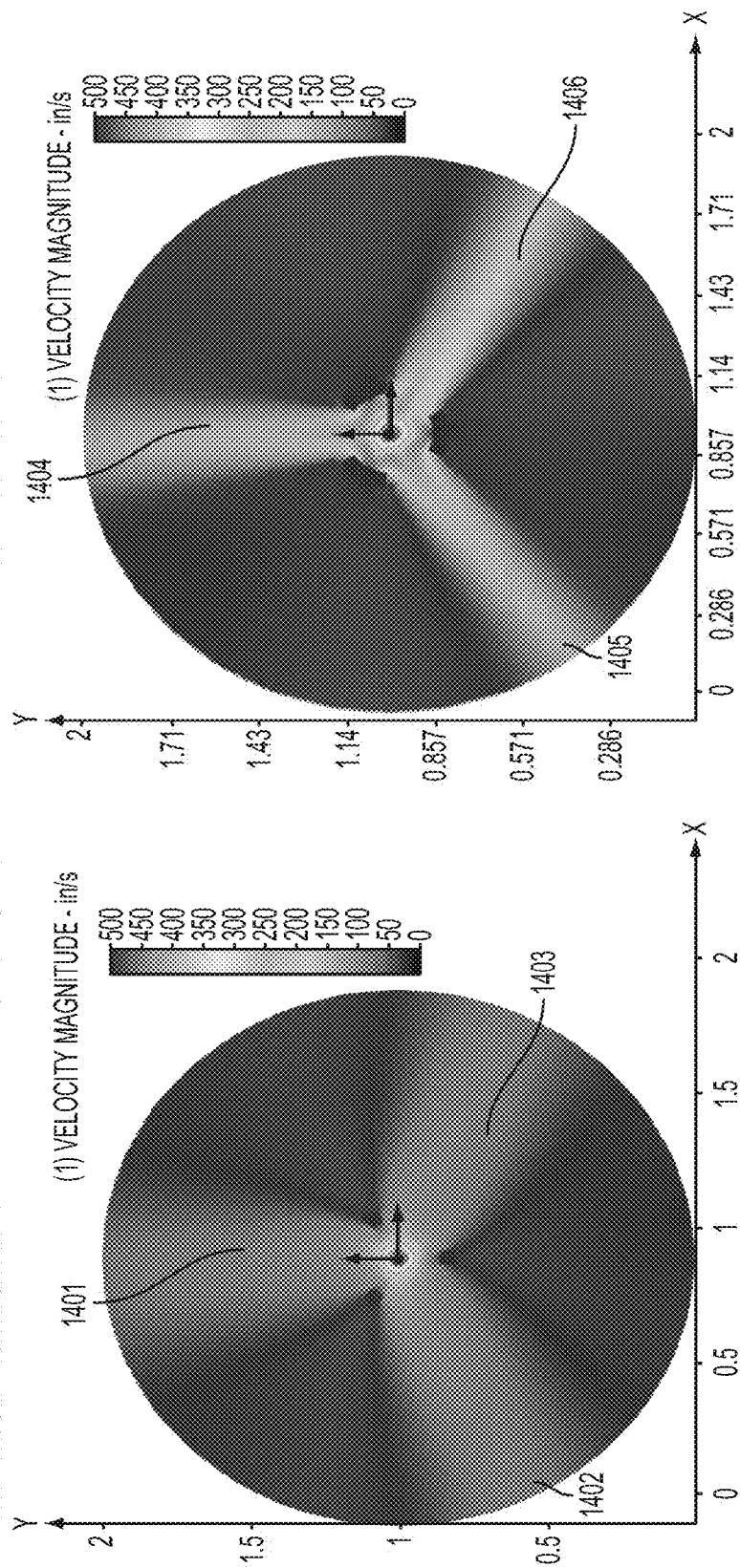
FIG. 14A illustrates the air velocity contour for a plasma torch tip having a slot width to castellation width ratio of about 3.5:1.
FIG. 14B illustrates the air velocity contour for a plasma torch having a slot width to castellation width ratio of about 1:1.

FIG. 14A illustrates the air velocity contour for a plasma torch tip having a slot width to castellation width ratio of about 3.5:1. FIG. 14B illustrates the air velocity contour for a plasma torch tip having a slot width to castellation width ratio of about 1:1. The plasma torch shields used for these examples each have three castellations and three slots disposed between the torch tip castellations. The first torch tip (FIG. 14A) has a slot width to castellation width of about 3.5:1. The second torch tip (FIG. 14B) has a slot width to castellation width of about 1:1.

Air velocity contours 1401, 1402, and 1403, shown in FIG. 14A, demonstrate the flow of air around each of the three torch castellations of the first torch tip during a typical drag cutting application. Similarly, air velocity contours 1404, 1405, and 1406, shown in FIG. 14B, demonstrate the flow of air around each of the three torch castellations of the second torch tip during a similar drag cutting application. As shown in FIG. 14A, the first torch tip generates significantly larger air velocity contours 1401, 1402, and 1403 than the air velocity contours 1404, 1405, and 1406 generated using the second shield. The added air flow, generated by using a torch tip, as described herein, in which the slot width at least twice the castellation width, can reduce molten spatter buildup during operation of the plasma arc torch, lengthen nozzle life, and increase plasma arc stability.

Figure 15:
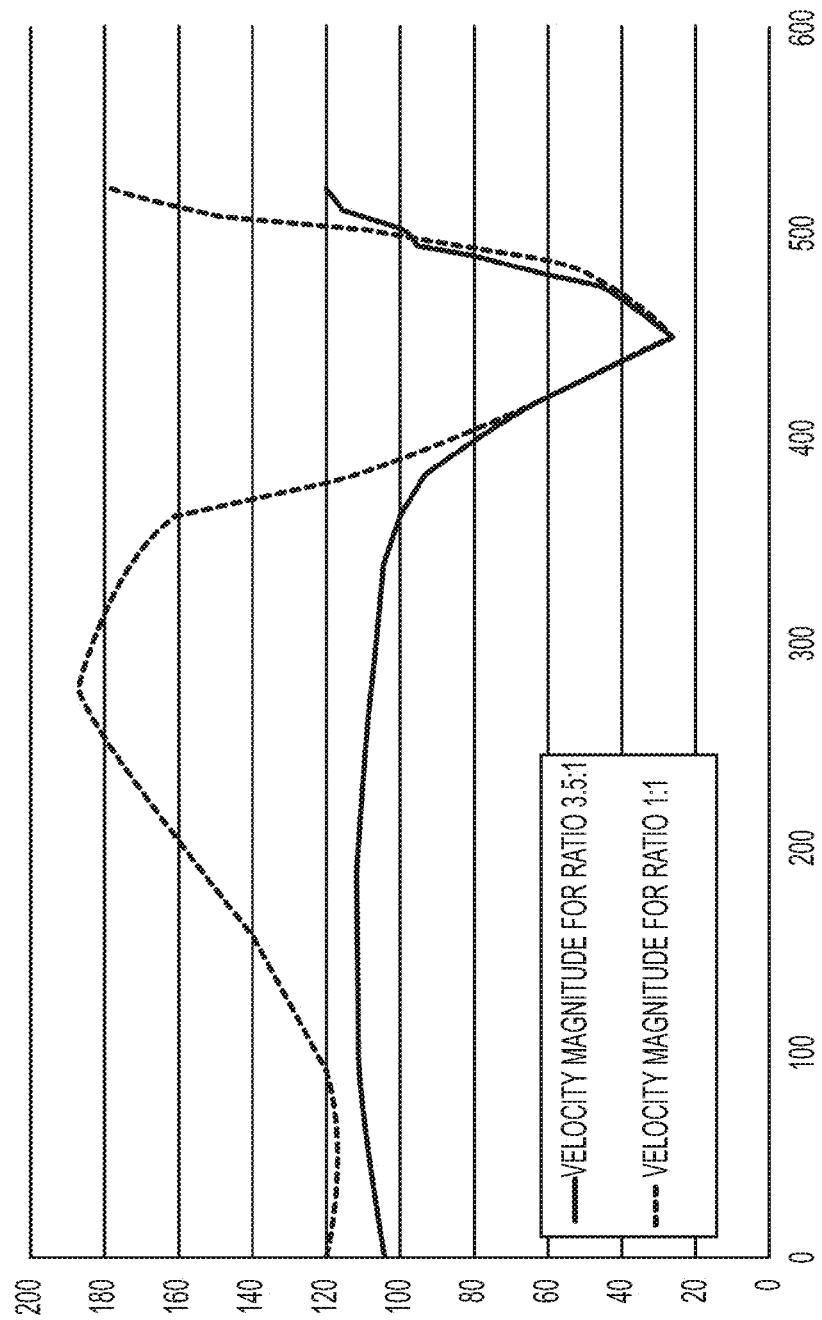
FIG. 15 includes plots of air velocity variations for a plasma torch having a slot width to castellation width ratio of about 1:1 and a plasma torch having a slot width to castellation width ratio of about 3.5:1.

FIG. 15 includes plots of air velocity variations for a plasma torch having a slot width to castellation width ratio of about 1:1 (for which air velocity contours are shown in FIG. 14B) and a plasma torch having a slot width to castellation width ratio of about 3.5:1 (for which air velocity contours are shown in FIG. 14A). The plots shown in FIG. 15 illustrate air velocity changes in the surface of each torch along a 90 degree arc. Each torch shield has a diameter of about 0.27 inch between castellation inner surfaces. The radius from the center point to a castellation inner surface is 0.135 inches and the velocity profiles are plotted for a 0.007 standoff (as the velocity profile at the wall is theoretically 0) toward the center point from the inner surface. As shown in FIG. 15, the variations of air velocity in the air flowing around the castellations of the first torch (slot width to castellation width ratio of about 3.5:1, FIG. 14A) is much less than the variations observed in air velocity in the air flowing around the castellations of the second torch (slot width to castellation width ratio of about 1:1, FIG. 14B).

Although various aspects of the disclosed method have been shown and described, modifications may occur to those skilled in the art upon reading the specification. The present application includes such modifications and is limited only by the scope of the claims.

What is claimed is:

1. A torch tip for a plasma arc torch, the torch tip comprising:
    a body having a first end and a second end, the first end of the body configured to attach to the plasma arc torch;
    an end wall disposed at the second end of the body;
    a plasma exit orifice formed in the end wall at the second end of the body;
    at least two castellations formed in an exterior surface of the end wall, each castellation having a castellation width defined by a distance between a first sidewall of each castellation and a second sidewall of each castellation at the second end of the body;
    at least one slot disposed between the two castellations, each slot having a slot floor and a slot width, and the slot width being defined by a distance between the first sidewall of a first castellation and the second sidewall of a second castellation adjacent the first castellation at the second end of the body, the slot width increasing with axial or radial distance away from the plasma exit orifice;
    wherein the slot width is at least twice the castellation width.

2. The torch tip of claim 1 wherein the slot width increases on an order of at least about one unit with axial distance away from the plasma exit orifice.

3. The torch tip of claim 1 wherein the slot width increases on an order of at least about two units with radial distance away from the plasma exit orifice.

4. The torch tip of claim 1 wherein the slot floor having a slope that tapers toward the first end of the body in an outward radial direction within the at least one slot.

5. The torch tip of claim 1 wherein the slot width is about 0.24 inches.

6. The torch tip of claim 1 wherein the castellation width is about 0.064 inches.

7. The torch tip of claim 1 wherein a ratio of the slot width to the castellation width is about 2:1.

8. The torch tip of claim 1 wherein a ratio of the slot width to the castellation width is about 3.5:1.

9. The torch tip of claim 1 wherein the at least one slot has a slot floor and an exterior shape, the exterior shape having a generally V-shaped contour extending between a first point on the first sidewall of the first castellation, a lowermost point of the slot floor, and a second point on the second sidewall of the second castellation.

10. The torch tip of claim 9 wherein the V-shaped contour defines an angle of about 118 degrees.

11. The torch tip of claim 1 wherein the at least one slot has an exterior shape with a generally U-shaped structure that extends between a first point on the first sidewall of the first castellation and a second point on the second sidewall of the second castellation.

12. The torch tip of claim 1 wherein the torch tip is a shield.

13. The torch tip of claim 1 wherein the torch tip includes three castellations and three slots disposed between the castellations.

14. The torch tip of claim 1 wherein the castellation width is defined by the distance between the first sidewall and the second sidewall measured across an outer perimeter or an inner perimeter of each castellation.

15. A torch tip for a plasma arc torch, the torch tip comprising:
    a body having a first end and a second end, the first end of the body configured to attach to the plasma arc torch;
    an end wall disposed at the second end of the body;
    a plasma exit orifice formed in the end wall at the second end of the body;
    at least two castellations formed in an exterior surface of the end wall;
    at least one slot disposed between the two castellations, each slot extending between a first sidewall of a first castellation and a second sidewall of a second castellation adjacent the first castellation at the second end of the body, each slot having a slot floor and an exterior shape, the exterior shape having a generally V-shaped contour extending between a first point on the first sidewall of the first castellation, a lowermost point of the slot floor, and a second point on the second sidewall of the second castellation.

16. The torch tip of claim 15 wherein the V-shaped contour defines an angle of about 118 degrees.

17. The torch tip of claim 15 wherein the V-shaped contour results from using a cone-shaped tool on the second end of the body.

18. The torch tip of claim 15 wherein each castellation comprises a castellation width defined by a distance between the first sidewall of each castellation and the second sidewall of each castellation at the second end of the body and the at least one slot comprises a slot width defined by a distance between the first sidewall of the first castellation and the second sidewall of a second castellation adjacent the first castellation at the second end of the body, wherein the slot width is at least twice the castellation width.

19. A torch tip for a plasma arc torch, the torch tip comprising:
    a body having a first end and a second end, the first end of the body configured to attach to the plasma arc torch;
    an end wall disposed at the second end of the body;
    a plasma exit orifice formed in the end wall at the second end of the body;
    at least two castellations formed in an exterior surface of the end wall;
    at least one slot disposed between the two castellations, each slot extending between a first sidewall of a first castellation and a second sidewall of a second castellation adjacent the first castellation at the second end of the body, each slot having a slot floor and an exterior shape, the torch tip having the following characteristics:
    (c) a slope of the slot floor within the at least one slot tapers in an outward radial direction relative to the plasma exit orifice toward the first end of the body, and
    (d) the exterior shape of the at least one slot has a generally U-shaped structure that extends between a first point on the first sidewall of the first castellation and a second point on the second sidewall of the second castellation.

20. The torch tip of claim 19 wherein the exterior shape of the at least one slot has a widened U-shaped structure, a hemispherical elliptical structure, an oval elliptical structure, or an elliptical structure.

* * * * *